United States Patent
Tan

(10) Patent No.: US 10,409,525 B2
(45) Date of Patent: Sep. 10, 2019

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 473 days.

(21) Appl. No.: 14/860,722

(22) Filed: Sep. 22, 2015

(65) Prior Publication Data
US 2017/0046068 A1    Feb. 16, 2017

(30) Foreign Application Priority Data

Aug. 11, 2015   (TW) .............................. 104126076 A

(51) Int. Cl.
*G06F 3/06*       (2006.01)
*G06F 12/02*      (2006.01)

(52) U.S. Cl.
CPC .......... *G06F 3/0679* (2013.01); *G06F 3/0616* (2013.01); *G06F 3/0652* (2013.01); *G06F 12/02* (2013.01)

(58) Field of Classification Search
CPC .... G06F 3/0616; G06F 3/0652; G06F 3/0679; G06F 12/02
See application file for complete search history.

(56) References Cited

U.S. PATENT DOCUMENTS

| 2010/0037009 | A1* | 2/2010 | Yano .................. G06F 12/0246 711/103 |
| 2012/0017052 | A1  | 1/2012 | Sauber |
| 2013/0097362 | A1* | 4/2013 | Tan .................... G06F 12/0246 711/103 |
| 2014/0181434 | A1* | 6/2014 | Chau ....................... G06F 12/16 711/162 |
| 2014/0208011 | A1* | 7/2014 | Doatmas ............... G06F 3/0616 711/103 |

FOREIGN PATENT DOCUMENTS

| CN | 101236789 | 8/2008 |
| CN | 101645309 | 2/2010 |
| TW | 201207621 | 2/2012 |
| TW | I472927   | 2/2015 |

OTHER PUBLICATIONS

"Office Action of Taiwan Counterpart Application", dated Nov. 22, 2016, p. 1-p. 6, in which the listed references were cited.

* cited by examiner

*Primary Examiner* — Aracelis Ruiz
(74) *Attorney, Agent, or Firm* — JCIPRNET

(57) ABSTRACT

A memory management method for a rewritable non-volatile memory module is provided. The method includes: selecting at least one first physical erasing unit from at least part of physical erasing units according to a first parameter. The method further includes: selecting a second physical erasing unit from the at least one first physical erasing unit according to a second parameter, wherein the second parameter is different from the first parameter; and copying at least part of data stored in the second physical erasing unit to a third physical erasing unit.

22 Claims, 9 Drawing Sheets

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104126076, filed on Aug. 11, 2015. The entirety of the above-mentioned patent application is hereby incorporated by reference herein and made a part of this specification.

BACKGROUND

Technical Field

The present invention relates to a memory management method, and more particularly, to a memory management method for a rewritable non-volatile memory module, a memory storage device and a memory control circuit unit.

Description of Related Art

The growth of digital cameras, mobile phones, and MP3 players has been rapid in recent years. Consequently, the consumers' demand for storage media has increased tremendously. In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

In general, a memory storage device including the rewritable non-volatile memory module can release available physical erasing units by performing a garbage collection operation, and use physical erasing units in the rewritable non-volatile memory as evenly as possible in order to extend a lifetime of the rewritable non-volatile memory. For example, the traditional garbage collection operation selects one physical erasing unit having the least valid data from among the physical erasing units, and copies the valid data to another physical erasing unit in order to release the available physical erasing units. A traditional wear leveling operation refers to exchanging of the physical erasing units in a data area with the physical erasing units in a spare area each time after the rewritable non-volatile memory is operated over a fixed period of time or at a specific time-point, so that the physical erasing units having less erasing count in the data area may be exchanged to the spare area for programming (or writing) usage.

However, the traditional garbage collection procedure and the traditional wear leveling operation do not take in consideration of whether data stored in one specific physical erasing unit will be updated regularly. When the data stored in one specific physical erasing unit is updated regularly, even if the valid data stored by the specific physical erasing unit is moved to another physical erasing unit in the garbage collection operation, such valid data may be regarded as invalid right after being updated again. In other words, it is likely that the physical erasing unit stored with such valid data may be associated to the spare area again when the data is updated, such that the physical erasing unit originally stored with such valid data may be erased. Therefore, when next time the wear leveling operation is performed, since said physical erasing unit associated to the spare area again has the erasing count higher than other physical erasing units in the spare area, the chances of such physical erasing unit being exchanged to the data area again will be higher than other physical erasing units in the spare area. As such, this will cause the erasing counts of some physical erasing units in the rewritable non-volatile memory to be constantly increased, resulting in issues of uneven usage among the physical erasing units of the rewritable non-volatile memory.

Accordingly, it is one of the major subjects in the industry as how to avoid increases in frequency of performing the wear leveling operation caused by performing the garbage collection operation, and allow usage of each physical erasing unit to be more even in order to effectively extend the lifetime of the rewritable non-volatile memory.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory management method, a memory storage device and a memory control circuit unit, which are capable of effectively allowing wearing of the physical erasing units to be more even in order to extend the lifetime of the memory storage device.

An exemplary embodiment of the present invention provides a memory management method for a rewritable non-volatile memory module, and the rewritable non-volatile memory module includes a plurality of physical erasing units. The memory management method includes: (a) selecting at least one first physical erasing unit from at least part of the physical erasing units according to a first parameter; (b) selecting a second physical erasing unit from the at least one first physical erasing unit according to a second parameter, wherein the second parameter is different from the first parameter; and (c) copying at least part of data stored in the second physical erasing unit to a third physical erasing unit.

An exemplary embodiment of the present invention provides a memory control circuit unit configured to control a rewritable non-volatile memory module. The rewritable non-volatile memory module includes a plurality of physical erasing units. The memory control circuit unit includes a host interface, a memory interface and a memory management circuit. The host interface is configured to couple to a host system, the memory interface is configured to couple to the rewritable non-volatile memory module, and the memory management circuit is coupled to the host interface and the memory interface. The memory management circuit is configured to perform a data merging procedure, and the data merging procedure includes the following. The memory management circuit selects at least one first physical erasing unit from at least part of the physical erasing units according to a first parameter. The memory management circuit selects a second physical erasing unit from the at least one first physical erasing unit according to a second parameter. The second parameter is different from the first parameter. The memory management circuit copies at least part of data stored in the second physical erasing unit to a third physical erasing unit.

An exemplary embodiment of the present invention provides a memory storage device which includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to perform a data merging procedure, and the data merging procedure includes: selecting at least one first physical erasing unit from at least part of physical erasing units according to a first parameter. The memory control circuit unit selects a second physical erasing unit from the at least one first physical erasing unit according to a second parameter. The second parameter is different from the first parameter. The memory control circuit unit copies at least part of data stored in the second physical erasing unit to a third physical erasing unit.

Based on the above, in the exemplary embodiments of the present invention, the physical erasing unit for the garbage collection operation is selected according to some parameters related to the physical erasing unit. Accordingly, the garbage collection operation may be performed by using the physical erasing unit stored with data that is unchanged for long time, so as to effectively avoid increases in frequency of performing the wear leveling operation caused by performing the garbage collection operation. As a result, the exemplary embodiments of invention can allow the erasing counts of the physical erasing units to be more even, so as to extend the lifetime of the memory storage device.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
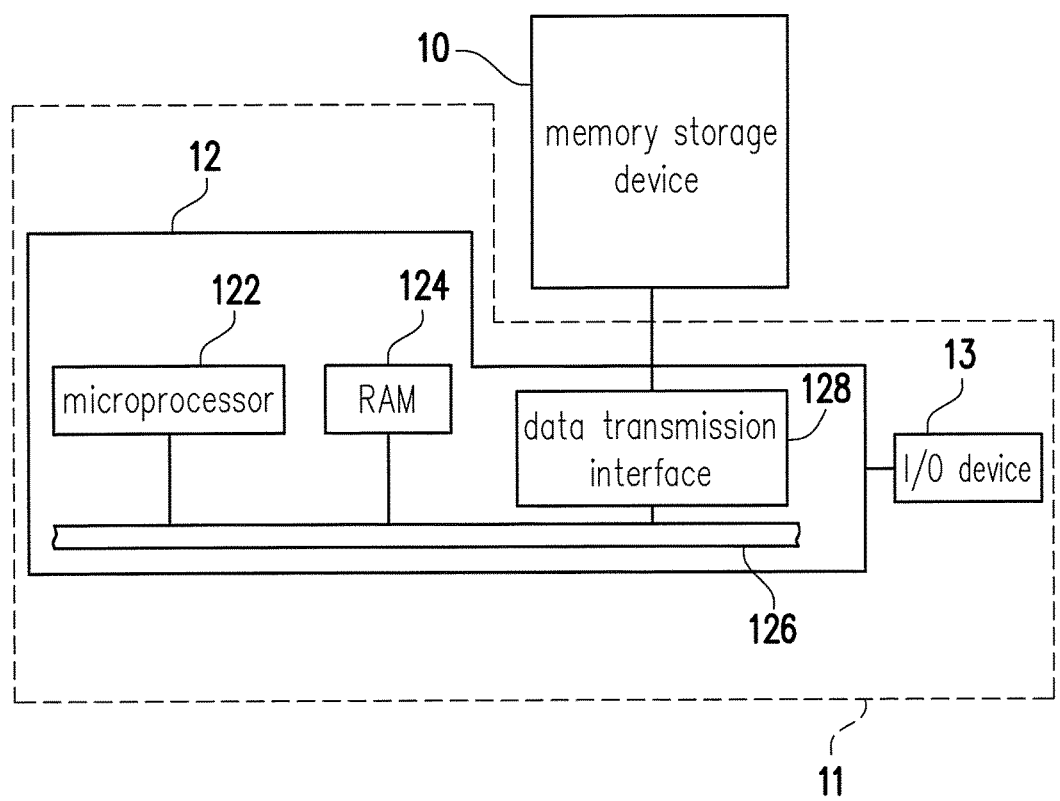
FIG. 1 is a schematic diagram illustrating a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data into the memory storage device or read data from the memory storage device.

Figure 2:
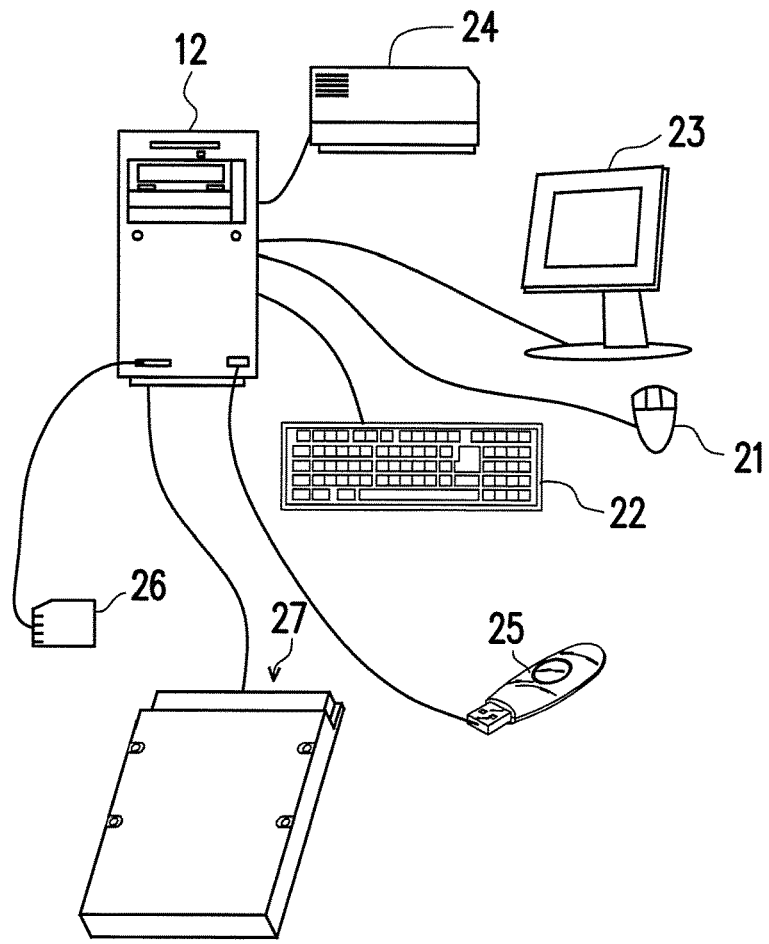
FIG. 2 is a schematic diagram illustrating a computer, an input/output device and a memory storage device according to an exemplary embodiment.

FIG. 1 is a schematic diagram illustrating a host system and a memory storage device according to an exemplary embodiment, and FIG. 2 is a schematic diagram of a computer, an input/output device, and a memory storage device according to an exemplary embodiment.

Referring to FIG. 1, a host system 11 includes a computer 12 and an input/output (I/O) device 1106. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In the present embodiment, the memory storage device 10 is electrically connected to other devices of the host system 11 through the data transmission interface 128. By using the microprocessor 122, the random access memory (RAM) 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
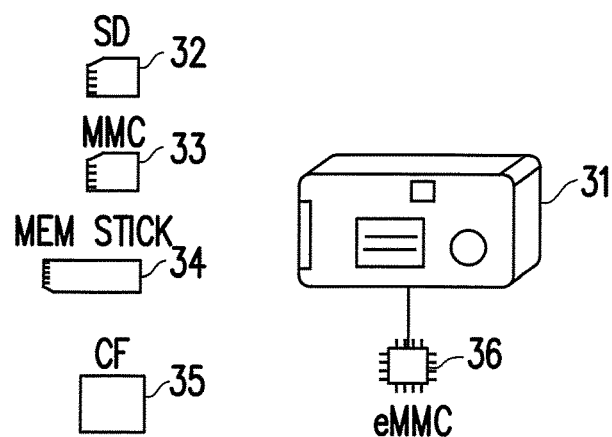
FIG. 3 is a schematic diagram illustrating a host system and a memory storage device according to an exemplary embodiment.

FIG. 3 is a schematic diagram illustrating a host system and a memory storage device according to an exemplary embodiment.

Generally, the host system 11 may substantially be any system capable of storing data with the memory storage device 10. Even though the host system 11 is illustrated as a computer system in the present exemplary embodiment, however, in another exemplary embodiment of the present invention, the host system 11 may be a digital camera, a video camera, a telecommunication device, an audio player, or a video player. For example, when the host system is a digital camera (video camera) 31 in FIG. 3, the rewritable non-volatile memory storage device may be a SD card 32, a MMC card 33, a memory stick 34, a CF card 35 or an embedded storage device 36 (as shown in FIG. 3). The embedded storage device 36 includes an embedded MMC (eMMC). It should be mentioned that the eMMC is electrically connected to a substrate of the host system, directly.

Figure 4:
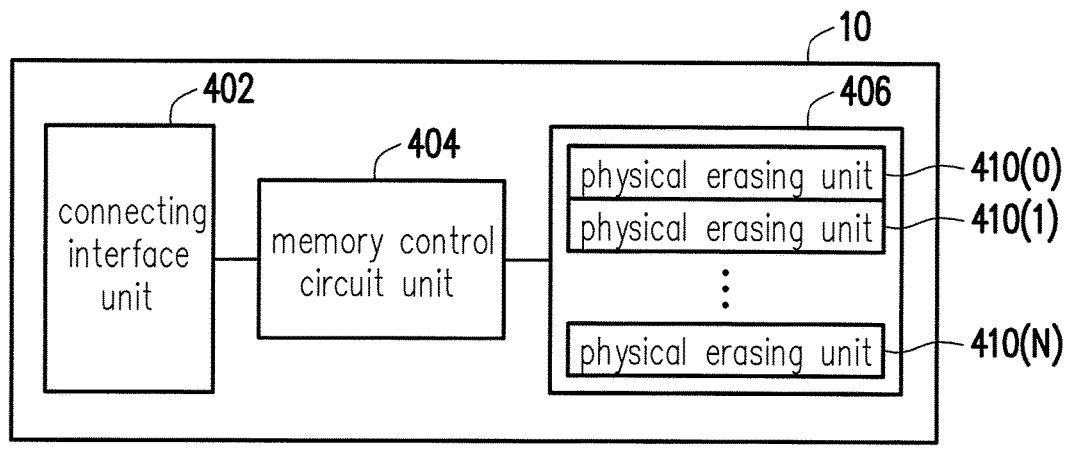
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. Nevertheless, it should be understood that the invention is not limited thereto. The connection interface unit 402 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or emplaced outside of a chip containing the memory control circuit unit.

The memory control circuit unit 404 is configured to execute a plurality of logic gates or control commands which are implemented in form of hardware or firmware, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 bytes. However, in other exemplary embodiments, the data bit area may also include more or less of the physical access addresses, and an amount and a size of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a Multi Level Cell (MLC) NAND flash memory module (i.e., a flash memory module capable of storing two data bits in one memory cell). However, the disclosure is not limited thereto. The rewritable non-volatile memory module 406 may also be a Single Level Cell (SLC) NAND flash memory module, (i.e., a flash memory module capable of storing one data bit in one memory cell), a Trinary Level Cell (TLC) NAND flash memory module (i.e., a flash memory module capable of storing three data bits in one memory cell), other flash memory modules or any memory module having the same features.

Figure 5:
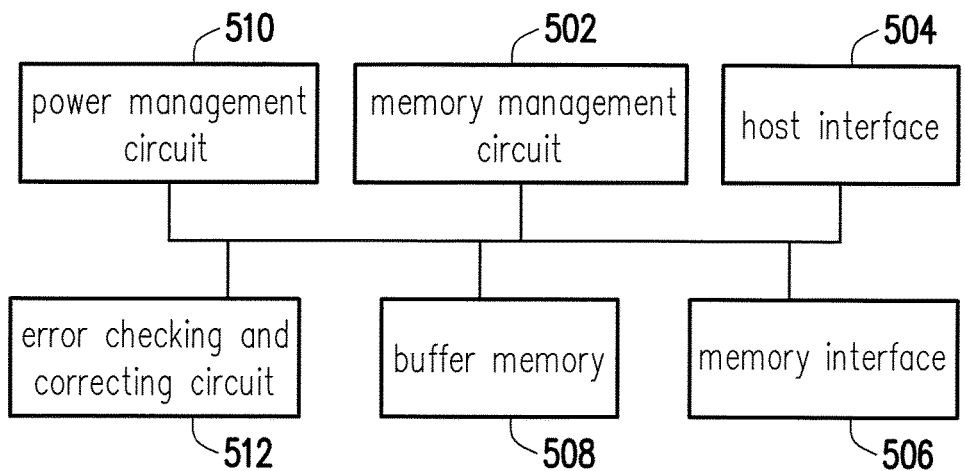
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. During operations of the memory storage device 10, the control commands are executed to execute various operations such as writing, reading and erasing data.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment of the invention, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). Particularly, the read only memory has an activate code, which is executed by the microprocessor unit to load the control commands stored in the rewritable non-volatile memory module 406 to the random access memory of the memory management circuit 502 when the memory control circuit unit 404 is enabled. Thereafter, the control commands are executed by the microprocessor unit to execute operations of writing, reading or erasing data.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In the present exemplary embodiment, the host interface 504 is compatible with the SATA standard. However, it is to be understood that the invention is not limited thereto. The host interface 504 may also be PATA standard, IEEE 1394 standard, PCI Express standard, USB standard, UHS-I interface standard, UHS-II interface standard, SD standard, MS standard, MMC standard, CF standard, IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

In an exemplary embodiment, the memory control circuit unit 404 further includes a buffer memory 508, a power management circuit 510 and an error checking and correcting circuit 512.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, when the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

Figure 6A:
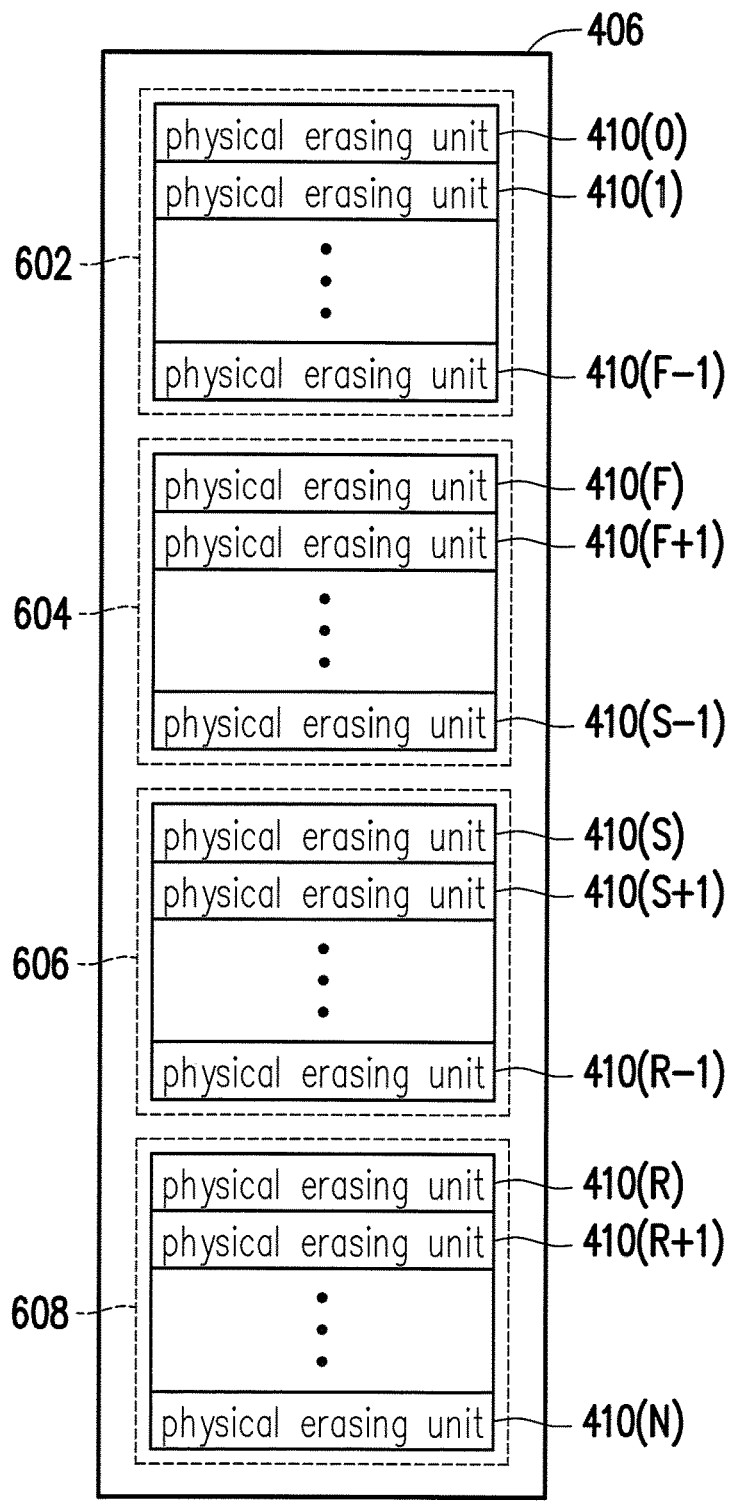
FIG. 6A and FIG. 6B are schematic diagrams illustrating an example of managing the physical erasing units according to an exemplary embodiment.
Figure 6B:
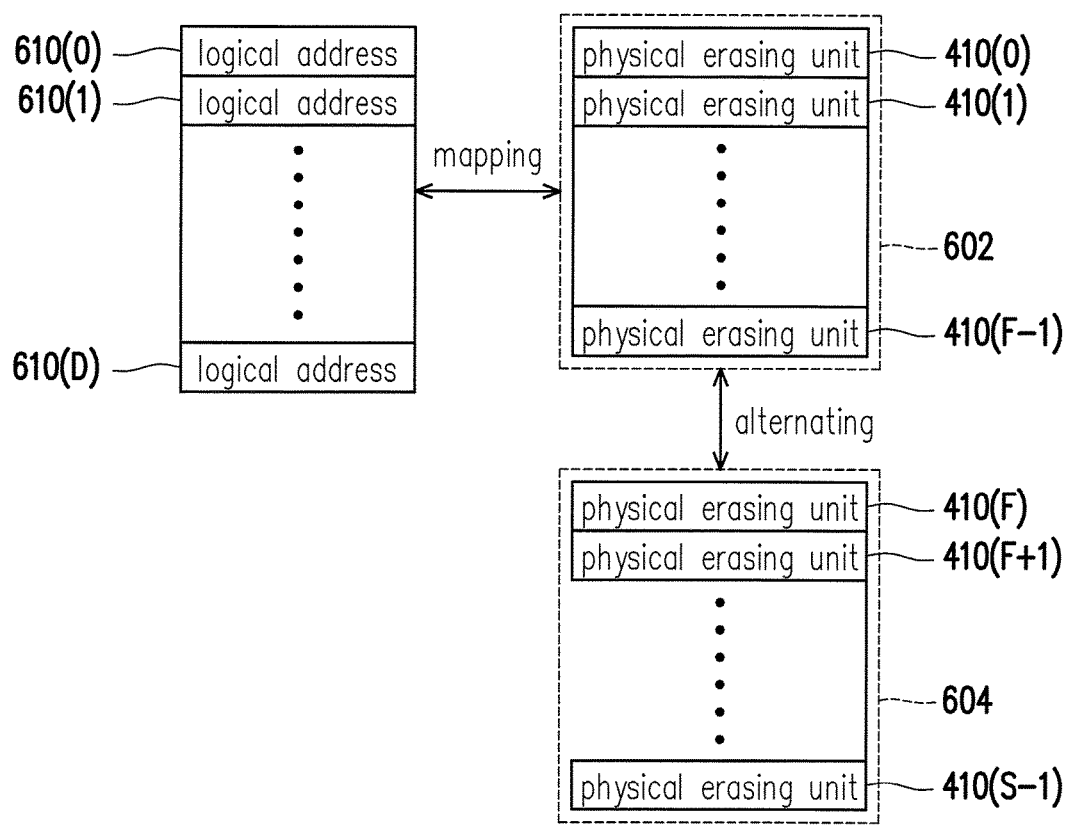

FIG. 6A and FIG. 6B are schematic diagrams illustrating an example of managing the physical erasing units according to an exemplary embodiment.

It should be understood that terms, such as "get", "group", "divide", "associate" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

Referring to FIG. 6A, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management unit 502 selects the physical erasing units from the spare area 604, and writes the data into the selected physical erasing units in order to replace the physical erasing units in the data area 602.

The physical erasing units logically belonging to the system area 606 are used to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if there are still available physical erasing units in the replacement area 608 when the physical erasing units of the data area 602 are damaged, the memory management circuit 502 gets the available physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operations of the memory storage device 10, grouping relations of the physical erasing units for associating with the data area 602, the spare area 604, the system area 606, and replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 6B, as described above, the physical erasing units of the data area 602 and the spare area 604 are configured to store data written from the host system 11 in an alternating manner. In the present exemplary embodiment, the memory control circuit unit 404 (or the memory management circuit 502) allocates logical addresses 610(0) to 610(D) to the host system 11 for mapping a part of physical erasing units 414(0) to 410(F−1) in the data area 602, so as to facilitate in data access on the physical erasing units stored with the data by the alternating manner. Particularly, the host system 11 may access the data in the data area 602 through the logical addresses 610(0) to 610(D). Further, the memory control circuit unit 404 (or the memory management circuit 502) establishes a logical address-physical erasing unit mapping table to record a mapping relation between the logical addresses and the physical erasing units. The logical address-physical erasing unit mapping table may also record, for example, various corresponding relations between logical and physical entities, such as a mapping relation between the logical addresses and the physical programming units, a mapping relation between the logical programming units and the physical programming units and/or a mapping relation between the logical programming units and the physical erasing units, which are not particularly limited by the present invention.

In the present exemplary embodiment, the memory control circuit unit 404 (or the memory management circuit 502) selects the physical erasing unit for a garbage collection operation according to a plurality of parameters. For example, the memory control circuit unit 404 (or the memory management circuit 502) selects at least one physical erasing unit (also known as at least one first physical erasing unit) from at least part of the physical erasing units according to one parameter (also known as a first parameter). Subsequently, the memory control circuit unit 404 (or the memory management circuit 502) selects one physical erasing unit (also known as a second physical erasing unit) from the at least one first physical erasing unit (which is selected according to the first parameter) according to another parameter (also known as a second parameter), wherein the second parameter is different from the first parameter. Thereafter, the memory control circuit unit 404 (or the memory management circuit 502) copies at part of data stored in the second physical erasing unit to another gotten physical erasing unit (also known as a third physical erasing unit), so as to release available physical erasing units.

Specifically, the memory control circuit unit 404 (or the memory management circuit 502) records a specific property data count for each of the physical erasing units 410(0) to 410(N) and records at least one of an erasing count and a writing order mark for each of the physical erasing units 410(0) to 410(N). For instance, the memory control circuit unit 404 (or the memory management circuit 502) records one specific property data count for each of the physical erasing units in the data 602 according to the number of invalid data in the physical erasing units in the data area 602. In other words, the specific property data count can represent an invalid data amount. For example, the specific property data count of each of the physical erasing units indicates the number of the physical programming units stored with the invalid data among the physical programming units in each of the physical erasing units in the data area 602. However, the present invention is not limited thereto. For example, in another exemplary embodiment, the specific property data count may also indicate the number of the physical programming units stored with valid data among the physical programming units in each of the physical erasing units in the data area 602. For example, the specific property data count can be recorded into a specific property data count table or the corresponding physical erasing unit.

Moreover, the erasing count of each of the physical erasing units 410(0) to 410(N) is limited. For example, the physical erasing unit is damaged after being erased for ten thousand times. Further, when partial capacity loss in storage capacity or significant degradation in performance occurs due to wearing of the physical erasing unit, the data stored by the user may be lost or the data cannot be stored. In particular, wearing of the physical erasing unit is depending on the number of times each of the physical erasing units is programmed or erased. That is, if one physical erasing unit is merely programmed (or written) once without further being programmed or written, a wearing degree of such physical erasing unit is relatively low. Conversely, if one physical erasing unit is repeatedly programmed and erased, the wearing degree of such physical erasing unit is relatively high. For example, when one physical erasing unit in the rewritable non-volatile memory module 406 is erased, the memory control circuit unit 404 (or the memory management circuit 502) adds 1 to the erasing count corresponding to such physical erasing unit. Similarly, the erasing count can be recorded into an erasing count table or the corresponding physical erasing unit.

In the present exemplary embodiment, the memory control circuit unit 404 (or the memory management circuit 502) selects the physical erasing unit for the garbage collection operation according to at least two of the specific property data count, the erasing count and the writing order mark recorded for each of the physical erasing units. For example, in an exemplary embodiment, the first parameter includes the writing order mark and the specific property data count, and the second parameter is the erasing count. In this example, the memory control circuit unit 404 (or the memory management circuit 502) records the writing order mark for each of the physical erasing units 410(0) to 410(F−1) in the data area 602 according to programming orders of the physical erasing units 410(0) to 410(F−1) in the data area 602. Herein, the programming order refers to a precedence of each of the physical erasing units 410(0) to 410(F−1) for being written with data. For example, the programming order of each of the physical erasing units 410(0) to 410(F−1) in the data area 602 indicates a new/old degree of the data in each of the physical erasing units 410(0) to 410(F−1). That is, the write data in the physical erasing unit being written with data earlier is older data, and the write data in the physical erasing unit being written with data later is newer data. In this example, the memory control circuit unit 404 (or the memory management circuit 502) establishes a queue for sequentially recording the physical erasing units 410(0) to 410(F−1) according to the programming orders of the physical erasing units 410(0) to 410(F−1) in the data area 602, so as to indicate the writing order mark of each of the physical erasing units in the data area 602. Particularly, in the present exemplary embodiment, the memory control circuit unit 404 (or the memory management circuit 502) groups the physical erasing units 410(0) to 410(F−1) in the data area 602 into a first part and a second part according to the writing order mark.

Figure 7:
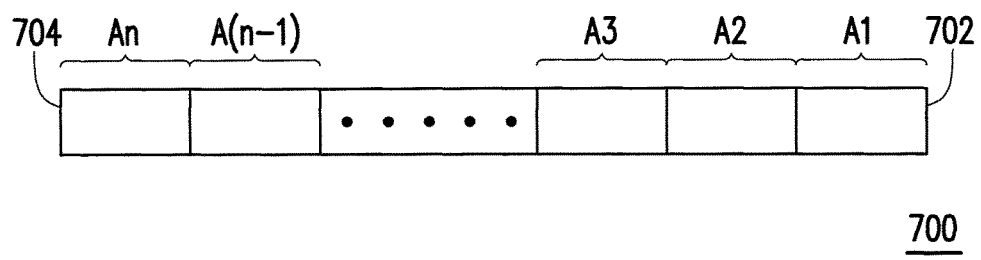
FIG. 7 is a schematic diagram illustrating a queue for recording the writing order mark corresponding to the physical erasing unit of the data area according to an exemplary embodiment.

FIG. 7 is a schematic diagram illustrating a queue for recording the writing order mark corresponding to the physical erasing unit of the data area according to an exemplary embodiment.

Referring to FIG. 7, in the present exemplary embodiment, a queue 700 established by the memory control circuit unit 404 (or the memory management circuit 502) has a first end 702, a second end 704, and a plurality of positions A1 to An provided between the first end 702 and the second end 704. Herein, the first end 702 is a head end of the queue 700, and the second end 704 is a tail end of the queue 700. Nevertheless, it should be understood that the invention is not limited thereto. In another exemplary embodiment, the first end 702 may also be the tail end of the queue 700, and the second end 704 may also be the head end of the queue 700. The queue 700 may be stored into the buffer memory 508 or the random access memory 124 in form of table, and updated into the rewritable non-volatile memory module 406 when the host system 11 is shut down or when the power of the memory storage device 10 is turned off.

Figure 8A:
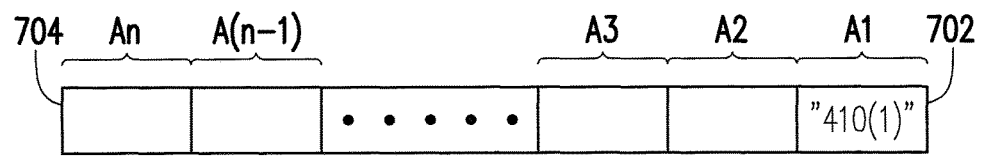
FIG. 8A and FIG. 8B are schematic diagrams illustrating a method of assigning the writing order mark for the physical erasing unit of the data area according to an exemplary embodiment.
Figure 8B:
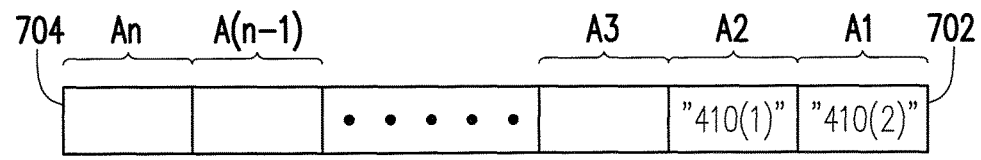

FIG. 8A and FIG. 8B are schematic diagrams illustrating a method of assigning the writing order mark for the physical erasing unit of the data area according to an exemplary embodiment.

Referring to FIG. 8A, when the memory control circuit unit 404 (or the memory management circuit 502) receives an operation command sequence for writing data (also known as first data) into a logical address 610(1) (also known as a first logical address) from the host system 11, the memory control circuit unit 404 (or the memory management circuit 502) programs the first data allocated to the first logical address 610(1) into one physical erasing unit (e.g., a physical erasing unit 410(1)), maps the physical erasing unit 410(1) to the first logical address 610(1) (i.e., associates the physical erasing unit 410(1) to the data area 602), and records the physical erasing unit 410(1) mapped to the first logical address 610(1) into the position A1 in the queue 700 starting from the first end 702 of the queue 700. It should be noted that, the invention is not intended to limit a manner for recording the physical erasing unit into the queue 700. For instance, the memory control circuit unit 404 (or the memory management circuit 502) can record information for representing the physical erasing unit 410(1) into the queue 700. For example, "410(1)" as depicted in the queue 700 in FIG. 8A may be a serial number, an identity value or a corresponding logical address of the physical erasing unit 410(1).

Referring to FIG. 8B, after programming the first data into the physical erasing unit 410(1) mapped to the first logical address 610(1), when the memory control circuit unit 404 (or the memory management circuit 502) receive an operation command sequence for writing data (also known as second data) into a logical address 610(2) (also known as a second logical address) from the host system 11, the memory control circuit unit 404 (or the memory management circuit 502) programs the second data allocated to the second logical address 610(2) into one physical erasing unit (e.g., a physical erasing unit 410(2)), maps the physical erasing unit 410(2) to the second logical address 610(2) (i.e., associates the physical erasing unit 410(2) to the data area 602), and records the physical erasing unit 410(2) mapped to the second logical address 610(2) into the queue 700. Similarly, "410(2)" as depicted in the queue 700 in FIG. 8B may be a serial number, an identity value or a corresponding logical address of the physical erasing unit 410(2).

At the time, as shown in FIG. 8B, the position A2 for recording the physical erasing unit 410(1) mapped to the first logical address 610(1) is arranged after the position A1 for recording the physical erasing unit 410(2) mapped to the second logical address 610(2) in the queue 700. That is, a distance between the position A2 for recording the physical erasing unit 410(1) mapped to the first logical address 610(1) and the first end 702 is greater than a distance between the position A1 for recording the physical erasing unit 410(2) mapped to the second logical address 610(2) and the first end 702.

Figure 9:
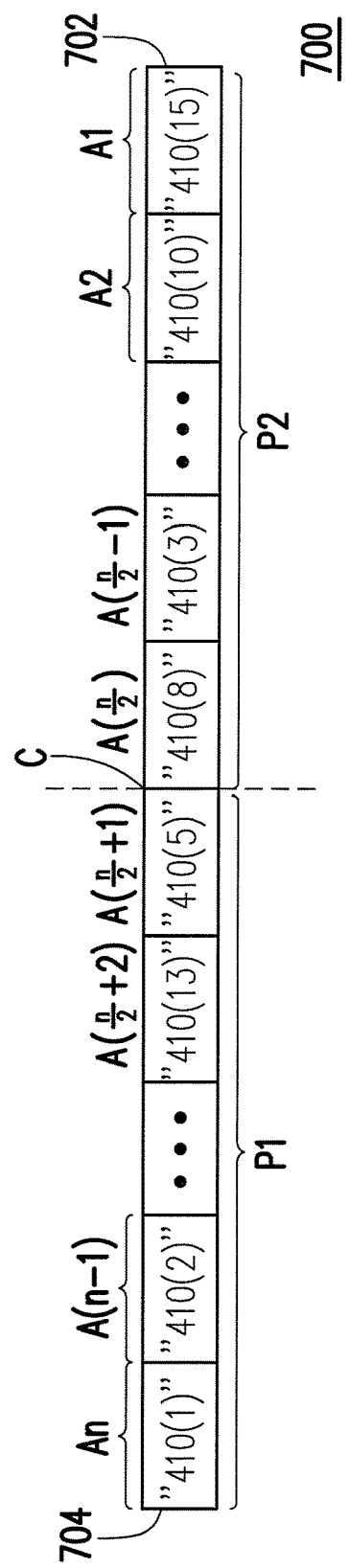
FIG. 9 is a schematic diagram illustrating the operation of grouping the physical erasing units of the data area into the first part and the second part according to the writing order mark according to an exemplary embodiment.

FIG. 9 is a schematic diagram illustrating the operation of grouping the physical erasing units of the data area into the first part and the second part according to the writing order mark according to an exemplary embodiment.

Referring to FIG. 9, in the present exemplary embodiment, it is assumed that the positions A1 to An of the queue 700 are currently recorded with information of the physical erasing units sequentially programmed according to the programming order of each of the physical erasing units by the memory control circuit unit 404 (or the memory management circuit 502), based on a center point C between the first end 702 and the second end 704, the memory control circuit unit 404 (or the memory management circuit 502) groups the physical erasing units recorded in the positions $$A\left(\frac{n}{2}+1\right)$$

to An between the center point C and the second end 704 into the physical erasing units belonging to a first part P1, and groups the physical erasing units recorded in the positions A1 to $$A\left(\frac{n}{2}\right)$$

between the first end 702 and the center point C into the physical erasing units belonging to a second part P2. It is worth mentioning that, the present invention is not intended to limit the method of grouping the physical erasing units into the first part and the second part. For example, in another exemplary embodiment, the memory control circuit unit 404 (or the memory management circuit 502) divides the positions A1 to An of the queue 700 into three equal parts, and groups the physical erasing units recorded in the positions of one of the parts close to the second end 704 into the first part and the physical erasing units recorded in the position of the remaining two parts into the second part. In other words, in the present exemplary embodiment, proportions of the first part and the second part in the queue 700 may be adjusted and set based on user demands or an execution performance of the memory storage device 10.

Specifically, with respect to the data that is unchanged for long time or even set to read-only after being written into the rewritable non-volatile memory module 406 (hereinafter, this sort of data is referred to as cool data), the physical erasing units stored with this sort of data has the erasing count being relatively low since the data is rarely updated or cannot be updated. In the present exemplary embodiment, the memory control circuit unit 404 (or the memory management circuit 502) records the sequentially programmed physical erasing units starting from the first end 702 of the queue 700. That is, the data in the physical erasing unit recorded in the position having smaller distance from the second end 704 and greater distance from the first end 702 in the queue 700 is order and rarely changed data, and the order and rarely changed data has higher possibility of being the cool data. Therefore, the memory control circuit unit 404 (or the memory management circuit 502) first sequentially selects the at least one first physical erasing unit from the first part P1 of the queue 700 starting from the second end 704 for aforesaid operation of determining the specific property data count. If the physical erasing unit having the specific property data count greater a predetermined value is not included in the first part P1 of the queue 700, the memory control circuit unit 404 (or the memory management circuit 502) then sequentially selects the at least one first physical erasing unit from the second part P2 of the queue 700 starting from the center point C. To describe the operation of selecting the at least one first physical erasing unit according to the writing order mark and the specific property data count of the invention more clearly, an example is further provided below with reference to FIG. 9 and FIG. 10.

Figure 10:
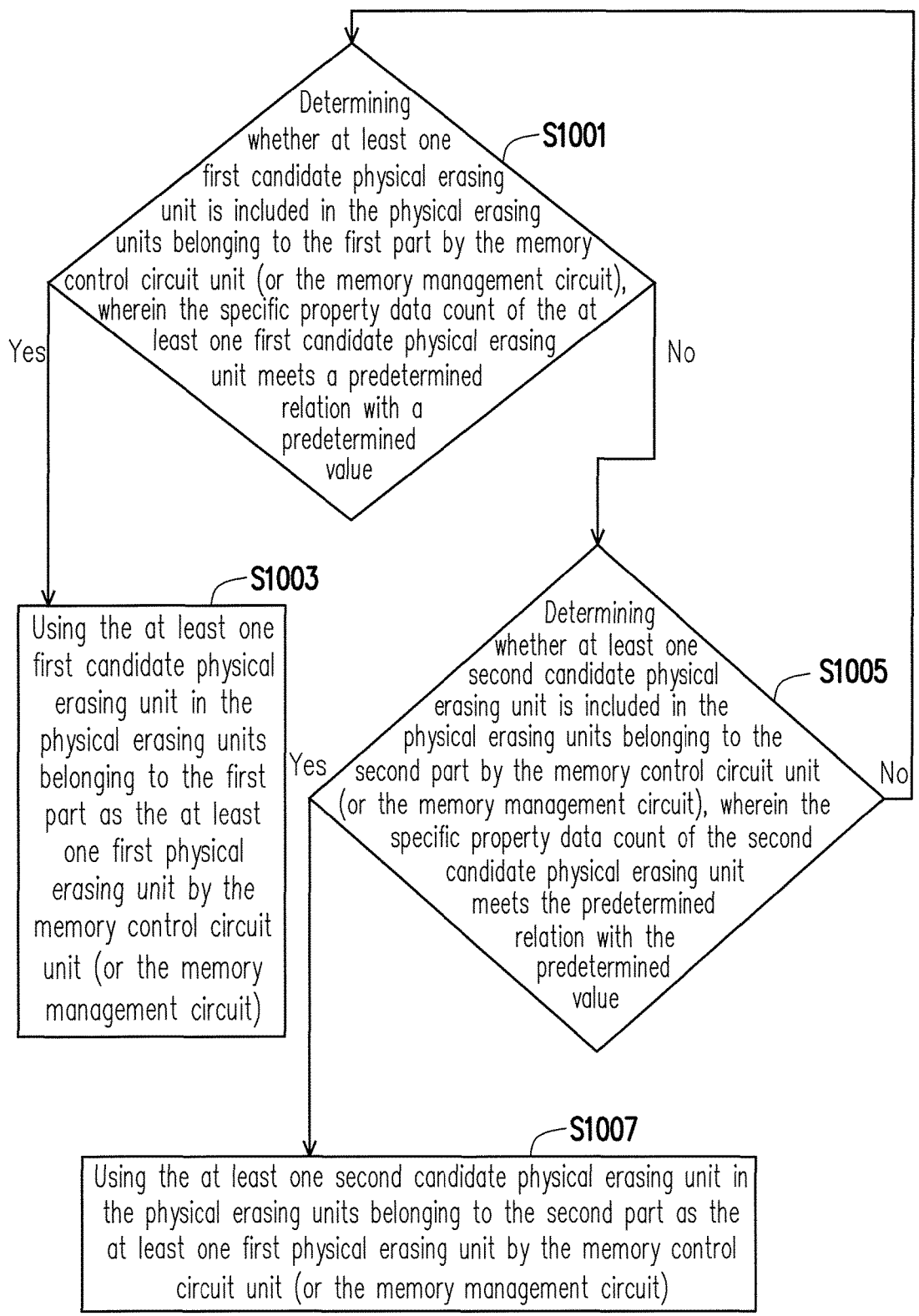
FIG. 10 is a flowchart illustrating the operation of selecting the at least one first physical erasing unit according to the writing order mark and the specific property data count according to an exemplary embodiment.

FIG. 10 is a flowchart illustrating the operation of selecting the at least one first physical erasing unit according to the writing order mark and the specific property data count according to an exemplary embodiment.

Referring to FIG. 9 and FIG. 10 together, in step S1001, the memory control circuit unit 404 (or the memory management circuit 502) determines whether at least one first candidate physical erasing unit is included in the physical erasing units belonging to the first part P1, wherein the specific property data count of the at least one first candidate physical erasing unit meets a predetermined relation with a predetermined value. For example, the memory control circuit unit 404 (or the memory management circuit 502) first determines a relation between the specific property data count of the physical erasing unit belonging to the first part P1 and the predetermined value, and selects the at least one first candidate physical erasing unit from the physical erasing units belonging to the first part P1 according to the relation between the specific property data count and the predetermined value. In the exemplary embodiment, because the specific property data count indicates the number of the physical programming units stored with the invalid data among the physical programming units in each of the physical erasing units in the data area 602, the memory control circuit unit 404 (or the memory management circuit 502) selects the physical erasing unit having the specific property data count greater than the predetermined value among the physical erasing units as the at least one first physical erasing unit. However, in the example where the specific property data count is configured to indicate the number of the physical programming units stored with the valid data among the physical programming units in each of the physical erasing units in the data area 602, the memory control circuit unit 404 (or the memory management circuit 502) selects the physical erasing unit having the specific property data count less than the predetermined value among the physical erasing units as the at least one first physical erasing unit.

If the at least one first candidate physical erasing unit is included in the physical erasing units belonging to the first part P1, in step S1003, the memory control circuit unit 404 (or the memory management circuit 502) uses the at least one first candidate physical erasing unit in the physical erasing units belonging to the first part P1 as the at least one first physical erasing unit. Otherwise, if the at least one first candidate physical erasing unit is not included in the physical erasing units belonging to the first part P1, in step S1005, the memory control circuit unit 404 (or the memory management circuit 502) determines whether at least one second candidate physical erasing unit is included in the physical erasing units belonging to the second part P2, wherein the specific property data count of the second candidate physical erasing unit meets the predetermined relation with the predetermined value.

For instance, in the present exemplary embodiment, it is assumed that the memory control circuit unit 404 (or the memory management circuit 502) determines that the at least one first candidate physical erasing unit having the specific property data count of the physical erasing unit that meets the predetermined relation with the predetermined value is not included in the physical erasing units recorded in the positions A1 to $$A\left(\frac{n}{2}+1\right)$$

corresponding to the first part P1 in step S1001. Accordingly, the memory control circuit unit 404 (or the memory management circuit 502) continues to determine whether the at least one second candidate physical erasing unit having the specific property data count of the physical erasing unit that meets the predetermined relation with the predetermined value is included in the physical erasing units recorded in the positions A1 to $$A\left(\frac{n}{2}\right)$$

corresponding to the second part P2 in step S1005. Herein, it is assumed that the memory control circuit unit 404 (or the memory management circuit 502) determines that the physical erasing units having the specific property data count of the physical erasing unit that meets the predetermined relation with the predetermined value included in the physical erasing units recorded in the positions A1 to $$A\left(\frac{n}{2}\right)$$

are a physical erasing unit 410(8) and a physical erasing unit 410(3) recorded in the position $$A\left(\frac{n}{2}\right)$$

and the position $$A\left(\frac{n}{2}-1\right)$$

respectively. Accordingly, the physical erasing unit 410(8) and the physical erasing unit 410(3) may be regarded as the at least one second candidate physical erasing unit.

Because the memory control circuit unit 404 (or the memory management circuit 502) determines that the at least one second candidate physical erasing unit is included in the physical erasing units belonging to the second part P2 in step S1005, the memory control circuit unit 404 (or the memory management circuit 502) then uses the at least one second candidate physical erasing unit (i.e., the physical erasing unit 410(8) and the physical erasing unit 410(3)) in the physical erasing units belonging to the second part P2 as the at least one first physical erasing unit in step S1007.

It is worth mentioning that, in the present exemplary embodiment, before selecting the physical erasing unit for the garbage collection operation according to the first parameter and the second parameter, the memory control circuit unit 404 (or the memory management circuit 502) determines whether available physical erasing units among the physical erasing units are less than a predetermined available number, and performs the operation of selecting the physical erasing unit for the garbage collection operation according the first parameter and the second parameter only when the available physical erasing units among the physical erasing units are less than the predetermined available number. However, the present invention is not limited thereto. For example, in another exemplary embodiment, the memory control circuit unit 404 (or the memory management circuit 502) performs the operation of selecting the physical erasing unit for the garbage collection operation according the first parameter and the second parameter regularly at a fixed interval.

Further, in the present exemplary embodiment, the predetermined value is obtained from a calculation according to a ratio of the number of the physical erasing units in the data area 602 and the number of all the physical erasing units in the rewritable non-volatile memory module 406, together with the number of the physical programming units in one physical erasing unit. For example, the memory control circuit unit 404 (or the memory management circuit 502) first divides the number of the physical erasing units in the data area 602 by the number of the physical erasing units in the rewritable non-volatile memory module 406 in order to obtain a first value, and multiplies the number of the physical programming units in one physical erasing unit among the physical erasing units by the first value in order to obtain a second value. For example, it is assumed that the number of the physical erasing units in the data area 602 is "956", the number of the physical erasing units actually included in the rewritable non-volatile memory module 406 is "988", and the number of physical programming units in one physical erasing unit is "256". Accordingly, the first value obtained after the calculation is "0.967" (i.e., 956/988=0.967), and the second value is "248" (i.e., 0.967*256=248). Subsequently, the memory control circuit unit 404 (or the memory management circuit 502) subtracts the second value from the number of the physical programming units in one physical erasing unit in order to obtain a third value, and sets the third value as the predetermined value. For example, the memory control circuit unit 404 (or the memory management circuit 502) sets the third value "8" obtained by subtracting the second value "248" from the number of the physical programming units in one physical erasing unit "256" as the predetermined value. In other words, the predetermined value represents that at least 8 physical programming units in any one physical erasing unit selected from the data area 602 are stored with the invalid data when the physical erasing units in the data area 602 in the rewritable non-volatile memory module 406 are all fully written with data.

In particular, in the present exemplary embodiment, the predetermined value represents that, when the physical erasing units in the data area 602 in the rewritable non-volatile memory module 406 are all fully written with data, there are at least multiple physical programming units stored with the invalid data with an amount greater than or equal to the predetermined value in any one physical erasing unit selected from the data area 602. In other words, at least one physical erasing unit having the specific property data count greater than the predetermined value is definitely included in the physical erasing units in the data area 602 of the rewritable non-volatile memory module 406. Therefore, in step S1005, when the memory control circuit unit 404 (or the memory management circuit 502) determines that the at least one second candidate physical erasing unit having the specific property data count of the physical erasing unit that meets the predetermined relation with the predetermined value is not included in the physical erasing units belonging to the second part P2, the memory control circuit unit 404 (or the memory management circuit 502) will consider this result as a mistaken determination, and re-perform step S1001 again to confirm whether the at least one first candidate physical erasing unit (or the at least one second candidate physical erasing unit) is included in the physical erasing units belonging to the first part P1 (or the second part P2).

Thereafter, as described above, the memory control circuit unit 404 (or the memory management circuit 502) selects the physical erasing unit having the smallest erasing count in the at least one first physical erasing unit as the second physical erasing unit for the garbage collection operation. Further, during the garbage collection operation, the memory control circuit unit 404 (or the memory management circuit 502) gets the third physical erasing unit from the physical erasing units in the spare area 604, and copies the valid data stored in the second physical erasing unit to the third physical erasing unit. In the present exemplary embodiment, with operation of selecting the physical erasing unit according to the writing order mark and the specific property data count and the operation of determining the erasing count for the selected physical erasing unit, the physical erasing unit stored with the cool data which is order and rarely changed may be selected, and specific property data count of the selected physical erasing unit includes is greater. Accordingly, the memory control circuit unit 404 (or the memory management circuit 502) not only can select one physical erasing unit having the valid data being relatively less from physical erasing unit for the garbage collection operation, but can also avoid the increases in frequency of performing the wear leveling operation caused by constantly increasing erasing counts of some physical erasing units in the rewritable non-volatile memory due to the valid data being regularly updated after moving the valid data stored in one physical erasing unit to another physical erasing unit in the garbage collection operation.

It is worth mentioning that, in the exemplary embodiment where the first parameter includes the writing order mark and the specific property data count and the second parameter is the erasing count, the memory control circuit unit 404 (or the memory management circuit 502) selects the physical erasing unit for the garbage collection operation according to the writing order mark, the specific property data count and the erasing count of the physical erasing unit. However, the present invention is not limited thereto. For example, in another exemplary embodiment, the first parameter can be the specific property data count and the second parameter is at least one of the erasing count and the writing order mark. For example, the memory control circuit unit 404 (or the memory management circuit 502) can select the physical erasing unit for the garbage collection operation according to only the specific property data count and the writing order mark of the physical erasing unit or select the physical erasing unit for the garbage collection operation according to only the specific property data count and the erasing count of the physical erasing unit.

For instance, in an exemplary embodiment where the first parameter is the specific property data count and the second parameter is the writing order mark, the memory control circuit unit 404 (or the memory management circuit 502) can select the physical erasing unit for the garbage collection operation according to only the specific property data count and the writing order mark of the physical erasing unit. For example, the memory control circuit unit 404 (or the memory management circuit 502) first determines whether any physical erasing unit having the specific property data count of the physical erasing unit that meets the predetermined relation with the predetermined value is included in the physical erasing units in the data area 602, and selects the at least one first physical erasing unit that meets the predetermined relation. Subsequently, the memory control circuit unit 404 (or the memory management circuit 502) arranges the at least one first physical erasing unit according to the programming order of the at least one first physical erasing unit and records the writing order mark for the at least one first physical erasing unit. For example, the method of assigning the writing order mark is identical to the method described in FIG. 8A and FIG. 8B, which is not repeated hereinafter. Thereafter, the memory control circuit unit 404 (or the memory management circuit 502) can select the physical erasing unit that is the earliest written with data and stored with the older and rarely changed data according to the writing order mark as the second physical erasing unit for the garbage collection operation. In the exemplary embodiment where the first parameter is the specific property data count and the second parameter includes the writing order mark and the erasing count, similarly, the memory control circuit unit 404 (or the memory management circuit 502) selects at least one first physical erasing unit having the specific property data count of the physical erasing unit that meets the predetermined relation with the predetermined value from the physical erasing units. Further, the memory control circuit unit 404 (or the memory management circuit 502) arranges the at least one first physical erasing unit according to the programming order of the at least one first physical erasing unit and records the writing order mark for the at least one first physical erasing unit. Subsequently, the memory control circuit unit 404 (or the memory management circuit 502) selects at least one physical erasing unit (also known as at least one third candidate physical erasing unit) from the at least one first physical erasing unit according to the writing order mark. For example, the programming order of the at least one third candidate physical erasing unit is earlier than the programming order of other physical erasing unit in the at least one first physical erasing unit. Thereafter, the memory control circuit unit 404 (or the memory management circuit 502) selects the physical erasing unit having the smallest erasing count in the at least one third candidate physical erasing unit as the second physical erasing unit. That is, the erasing count of the second physical erasing unit is less than the erasing count of other physical erasing unit in the at least one third candidate physical erasing unit.

Furthermore, in an exemplary embodiment where the first parameter is the specific property data count and the second parameter is the erasing count, the memory control circuit unit 404 (or the memory management circuit 502) does not perform the corresponding step of selecting the at least one first physical erasing unit according to the writing order mark and the specific property data count in FIG. 10, but directly determines whether any physical erasing unit having the specific property data count of the physical erasing unit that meets the predetermined relation with the predetermined value is included in the physical erasing units in the data area 602, and selects the at least one first physical erasing unit that meets the predetermined relation. Subsequently, the memory control circuit unit 404 (or the memory management circuit 502) selects one physical erasing unit having the smallest erasing count from the at least one first physical erasing unit as the second physical erasing unit for the garbage collection operation. In the exemplary embodiment where the first parameter is the specific property data count and the second parameter includes the erasing count and the writing order mark, after the memory control circuit unit 404 (or the memory management circuit 502) selects the at least one first physical erasing unit having the specific property data count of the physical erasing unit that meets the predetermined relation with the predetermined value from the physical erasing units, the memory control circuit unit 404 (or the memory management circuit 502) selects the at least one third candidate physical erasing unit having the erasing count less than the erasing count of other physical erasing unit in the at least one first physical erasing unit from the at least one first physical erasing unit. Subsequently, the memory control circuit unit 404 (or the memory management circuit 502) arranges the at least one third candidate physical erasing unit according to the programming order of the at least one third candidate physical erasing unit and records the writing order mark for the at least one third candidate physical erasing unit. Thereafter, the memory control circuit unit 404 (or the memory management circuit 502) selects the second physical erasing unit having the earliest programming order from the at least one third candidate physical erasing unit according to the writing order mark. In other words, the writing order mark of the second physical erasing unit indicates that the programming order of the second physical erasing unit is earlier than the programming order of other physical erasing unit in the at least one third candidate physical erasing unit.

In yet another exemplary embodiment, the first parameter may also be the erasing count, and the second parameter is at least one of the specific property data count and the writing order mark. For example, when the first parameter is the erasing count and the second parameter is the specific property data count, the memory control circuit unit 404 (or the memory management circuit 502) first selects the at least one first physical erasing unit having the erasing count less than the erasing count of other physical erasing unit in the at least part of the physical erasing units from the at least part of the physical erasing units, and then selects the second physical erasing unit that meets the predetermined relation from the at least one first physical erasing unit. For example, the erasing count of the selected second physical erasing unit is less than the erasing count of other physical erasing unit in the at least one first physical erasing unit. When the first parameter is the erasing count and the second parameter includes the specific property data count and the writing order mark, after the memory control circuit unit 404 (or the memory management circuit 502) selects the at least one first physical erasing unit having the erasing count less than the erasing count of other physical erasing unit in the at least part of the physical erasing units from the at least part of the physical erasing units, the memory control circuit unit 404 (or the memory management circuit 502) first selects the at least one third candidate physical erasing unit having the specific property data count of the physical erasing unit that meets the predetermined relation with the predetermined value from the at least one first candidate physical erasing unit, arranges the at least one third candidate physical erasing unit according to the programming order of the at least one third candidate physical erasing unit and records the writing order mark for the at least one third candidate physical erasing unit. Thereafter, similarly, the memory control circuit unit 404 (or the memory management circuit 502) selects the second physical erasing unit having the earliest programming order from the at least one third candidate physical erasing unit according to the writing order mark.

Figure 11:
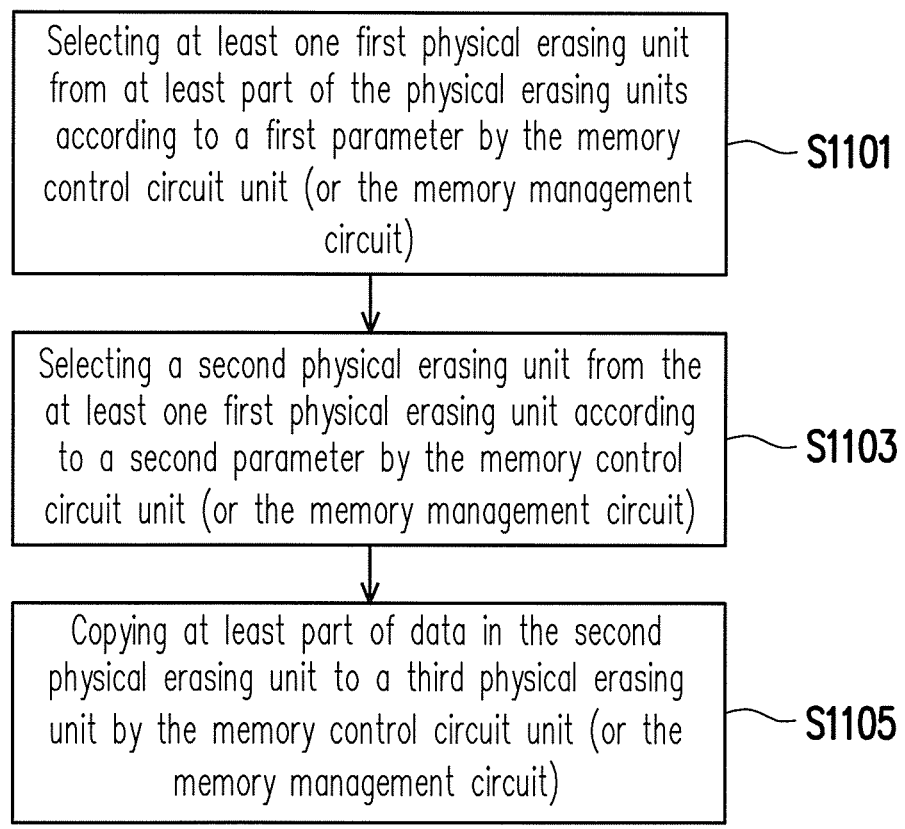
FIG. 11 is a flowchart illustrating a memory management method according to an embodiment.

FIG. 11 is a flowchart illustrating a memory management method according to an embodiment.

Referring to FIG. 11, in step S1101, the memory control circuit unit 404 (or the memory management circuit 502) selects at least one first physical erasing unit from at least part of the physical erasing units according to a first parameter. In step S1103, the memory control circuit unit 404 (or the memory management circuit 502) selects a second physical erasing unit from the at least one first physical erasing unit according to a second parameter.

Subsequently, in step S1105, the memory control circuit unit 404 (or the memory management circuit 502) copies at least part of data in the second physical erasing unit to a third physical erasing unit.

Particularly, as described above, in the present exemplary embodiment, steps S1101, S1103 and S1105 depicted in FIG. 11 are performed when the memory control circuit unit 404 (or the memory management circuit 502) determines that the available physical erasing units among the physical erasing units are less than the predetermined available number. However, the invention is not limited thereto. For example, in another exemplary embodiment of the invention, the memory control circuit unit 404 (or the memory management circuit 502) can perform steps S1101, S1103 and S1105 depicted in FIG. 11 regularly at a fixed interval. In addition, steps depicted in FIG. 11 are described in detail as above so that related description thereof is omitted hereinafter. It should be noted that, the steps depicted in FIG. 11 may be implemented as a plurality of program codes or circuits, and the invention is not limited thereto. Moreover, the method disclosed in FIG. 11 may be implemented with reference to above embodiments or implemented separately, and the invention is not limited thereto.

In summary, according to the memory management method of the invention, the physical erasing unit having the specific property data count greater than the predetermined value and stored with the data that is unchanged for longer time is used as the physical erasing unit for the garbage collection operation. Because such physical erasing unit has the greater specific property data count and the smaller erasing count, and is stored with the data that is unchanged for longer time, the increases in frequency of performing the wear leveling operation caused by performing the garbage collection operation may be reduced and the issue of the erasing counts of some physical erasing units in the rewritable non-volatile memory being constantly increased may also be effectively prevented. Accordingly, the wearing degree of the physical erasing units can be more even so that the lifetime of the memory storage device can be extended.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, wherein the rewritable non-volatile memory module comprises a plurality of physical erasing units, the memory management method comprising:
   (a) selecting at least one first physical erasing unit from at least part of the physical erasing units according to a first parameter;
   (b) selecting a second physical erasing unit from the at least one first physical erasing unit according to a second parameter, wherein the second parameter is different from the first parameter;
   (c) copying at least part of data stored in the second physical erasing unit to a third physical erasing unit;
   recording a writing order mark for each of the at least part of the physical erasing units and setting the writing order mark as one of the first parameter and the second parameter; and
   recording a specific property data count for each of the at least part of the physical erasing units and recording an erasing count for each of the at least part of the physical erasing units,
   wherein the first parameter comprises the writing order mark and the specific property data count which is configured to be representable of an invalid data amount, and the second parameter is the erasing count.

2. The memory management method of claim 1, further comprising:
   determining whether an amount of available physical erasing units among the physical erasing units are less than a predetermined available number,
   wherein if the amount of the available physical erasing units among the physical erasing units are less than the predetermined available number, the step (a), the step (b) and the step (c) are performed.

3. The memory management method of claim 1, wherein the step of selecting the at least one first physical erasing unit from the at least part of the physical erasing units according to the first parameter comprises:
   recording the writing order mark for each of the at least part of the physical erasing units according to a programming order of the at least part of the physical erasing units;
   grouping the at least part of the physical erasing units into a first part and a second part according to the writing order mark; and
   selecting the at least one first physical erasing unit from the physical erasing units belonging to one of the first part or the second part according to the specific property data count.

4. The memory management method of claim 3, wherein the step of recording the writing order mark for each of the at least part of the physical erasing units according to the programming order of the at least part of the physical erasing units comprises:
   allocating a plurality of logical addresses, wherein the logical addresses are mapped to the at least part of the physical erasing units;
   establishing a queue;
   programming first data allocated to a first logical address among the logical addresses into the physical erasing unit mapped to the first logical address among the physical erasing units;
   recording the physical erasing unit mapped to the first logical address into the queue;
   after programming the first data into the physical erasing unit mapped to the first logical address, programming second data allocated to a second logical address among the logical addresses into the physical erasing unit mapped to the second logical address among the physical erasing units; and
   recording the physical erasing unit mapped to the second logical address into the queue,
   wherein the queue has a first end, a second end, and a plurality of positions provided between the first end and the second end,
   wherein the position for recording the physical erasing unit mapped to the first logical address is arranged after the position for recording the physical erasing unit mapped to the second logical address in the queue, and a distance between the position for recording the physical erasing unit mapped to the first logical address and the first end is greater than a distance between the position for recording the physical erasing unit mapped to the second logical address and the first end.

5. The memory management method of claim 4, wherein the step of grouping the at least part of the physical erasing units into the first part and the second part according to the writing order mark comprises:
- based on a center point between the first end and the second end, grouping the physical erasing units recorded in the positions between the second end and the center point into the physical erasing units belonging to the first part, and grouping the physical erasing units recorded in the positions between the first end and the center point into the physical erasing units belonging to the second part.

6. The memory management method of claim 3, wherein the step of selecting the at least one first physical erasing unit from the physical erasing units belonging to one of the first part or the second part according to the specific property data count comprises:
- determining whether at least one first candidate physical erasing unit is included in the physical erasing units belonging to the first part, wherein the specific property data count of the at least one first candidate physical erasing unit meets a predetermined relation with a predetermined value;
- if the at least one first candidate physical erasing unit is included in the physical erasing units belonging to the first part, using the at least one first candidate physical erasing unit in the physical erasing units belonging to the first part as the at least one first physical erasing unit;
- if the at least one first candidate physical erasing unit is not included in the physical erasing units belonging to the first part, determining whether at least one second candidate physical erasing unit is included in the physical erasing units belonging to the second part, wherein the specific property data count of the at least one second candidate physical erasing unit meets the predetermined relation with the predetermined value;
- if the at least one second candidate physical erasing unit is included in the physical erasing units belonging to the second part, using the at least one second candidate physical erasing unit in the physical erasing units belonging to the second part as the at least one first physical erasing unit.

7. The memory management method of claim 6, wherein the step of selecting the second physical erasing unit from the at least one first physical erasing unit according to the second parameter comprises:
- selecting the second physical erasing unit from the at least one first physical erasing unit according to the erasing count, wherein the erasing count of the second physical erasing unit is less than the erasing count of other physical erasing unit in the at least one first physical erasing unit.

8. The memory management method of claim 6, wherein each of the physical erasing units comprises a plurality of physical programming units, the specific property data count of each of the at least part of the physical erasing units indicates the number of the physical programming units stored with invalid data among the physical programming units in each of the at least part of the physical erasing units, and the predetermined relation is the specific property data count being greater than predetermined value.

9. The memory management method of claim 8, further comprising:
- dividing a number of the at least part of the physical erasing units by a number of the physical erasing units of the rewritable non-volatile memory module in order to obtain a first value;
- multiplying a number of the physical programming units in one physical erasing unit among the physical erasing units by the first value in order to obtain a second value;
- subtracting the second value from the number of the physical programming units in one physical erasing unit in order to obtain a third value; and
- setting the third value as the predetermined value.

10. The memory management method of claim 6, wherein each of the physical erasing units comprises a plurality of physical programming units, the specific property data count of each of the at least part of the physical erasing units indicates a number of the physical programming units stored with valid data among the physical programming units in each of the at least part of the physical erasing units, and the predetermined relation is the specific property data count being less than predetermined value.

11. A memory control circuit unit for controlling a rewritable non-volatile memory module, wherein the rewritable non-volatile memory module comprises a plurality of physical erasing units, the memory control circuit unit comprising:
- a host interface configured to couple to a host system;
- a memory interface configured to couple to the rewritable non-volatile memory module; and
- a memory management circuit coupled to the host interface and the memory interface,
- wherein the memory management circuit is configured to perform a data merging procedure, and the data merging procedure comprises:
  - selecting at least one first physical erasing unit from at least part of the physical erasing units according to a first parameter by the memory management circuit;
  - selecting a second physical erasing unit from the at least one first physical erasing unit according to a second parameter by the memory management circuit, wherein the second parameter is different from the first parameter;
  - copying at least part of data stored in the second physical erasing unit to a third physical erasing unit by the memory management circuit;
  - recording a writing order mark for each of the at least part of the physical erasing units and setting the writing order mark as one of the first parameter and the second parameter; and
  - recording a specific property data count for each of the at least part of the physical erasing units and recording an erasing count for each of the at least part of the physical erasing units,
- wherein the first parameter comprises the writing order mark and the specific property data count which is configured to be representable of an invalid data amount, and the second parameter is the erasing count.

12. The memory control circuit unit of claim 11, wherein the memory management circuit is further configured to determine whether an amount of available physical erasing units among the physical erasing units are less than a predetermined available number,
- wherein if the amount of the available physical erasing units among the physical erasing units are less than the predetermined available number, the memory management circuit is further configured to perform the data merging procedure.

13. The memory control circuit unit of claim 11, wherein in the operation of selecting the at least one first physical erasing unit from the at least part of the physical erasing units according to the first parameter, the memory management circuit is further configured to record the writing order mark for each of the at least part of the physical erasing units according to a programming order of the at least part of the physical erasing units,
- wherein the memory management circuit is further configured to group the at least part of the physical erasing units into a first part and a second part according to the writing order mark,
- the memory management circuit is further configured to select the at least one first physical erasing unit from the physical erasing units belonging to one of the first part or the second part according to the specific property data count.

14. The memory control circuit unit of claim 13, wherein in the operation of selecting the at least one first physical erasing unit from the physical erasing units belonging to one of the first part or the second part according to the specific property data count, the memory management circuit is further configured to determine whether at least one first candidate physical erasing unit is included in the physical erasing units belonging to the first part, wherein the specific property data count of the at least one first candidate physical erasing unit meets a predetermined relation with a predetermined value,
- wherein if the at least one first candidate physical erasing unit is included in the physical erasing units belonging to the first part, the memory management circuit is further configured to use the at least one first candidate physical erasing unit in the physical erasing units belonging to the first part as the at least one first physical erasing unit,
- wherein if the at least one first candidate physical erasing unit is not included in the physical erasing units belonging to the first part, the memory management circuit is further configured to determine whether at least one second candidate physical erasing unit is included in the physical erasing units belonging to the second part, wherein the specific property data count of the at least one second candidate physical erasing unit meets the predetermined relation with the predetermined value,
- wherein if the at least one second candidate physical erasing unit is included in the physical erasing units belonging to the second part, the memory management circuit is further configured to use the at least one second candidate physical erasing unit in the physical erasing units belonging to the second part as the at least one first physical erasing unit.

15. A memory storage device, comprising:
a connection interface unit configured to couple to a host system;
a rewritable non-volatile memory module comprising a plurality of physical erasing units; and
a memory control circuit unit coupled to the connection interface unit and the rewritable non-volatile memory module,
wherein the memory control circuit unit is configured to perform a data merging procedure, and the data merging procedure comprises:
selecting at least one first physical erasing unit from at least part of the physical erasing units according to a first parameter by the memory control circuit unit;
wherein the memory control circuit unit selects a second physical erasing unit from the at least one first physical erasing unit according to a second parameter, wherein the second parameter is different from the first parameter; and
wherein the memory control circuit unit copies at least part of data stored in the second physical erasing unit to a third physical erasing unit,
wherein the memory control circuit unit records a writing order mark for each of the at least part of the physical erasing units and sets the writing order mark as one of the first parameter and the second parameter,
wherein the memory control circuit unit is further configured to record a specific property data count for each of the at least part of the physical erasing units and record an erasing count for each of the at least part of the physical erasing units,
wherein the first parameter comprises the writing order mark and the specific property data count which is configured to be representable of an invalid data amount, and the second parameter is the erasing count.

16. The memory storage device of claim 15, wherein the memory control circuit unit is further configured to determine whether an amount of available physical erasing units among the physical erasing units are less than a predetermined available number,
- wherein if the amount of the available physical erasing units among the physical erasing units are less than the predetermined available number, the memory control circuit unit is further configured to perform the data merging procedure.

17. The memory storage device of claim 15, wherein in the operation of selecting the at least one first physical erasing unit from the at least part of the physical erasing units according to the first parameter, the memory control circuit unit is further configured to record the writing order mark for each of the at least part of the physical erasing units according to a programming order of the at least part of the physical erasing units,
- wherein the memory control circuit unit is further configured to group the at least part of the physical erasing units into a first part and a second part according to the writing order mark,
- the memory control circuit unit is further configured to select the at least one first physical erasing unit from the physical erasing units belonging to one of the first part or the second part according to the specific property data count.

18. The memory storage device of claim 17, wherein in the operation of selecting the at least one first physical erasing unit from the physical erasing units belonging to one of the first part or the second part according to the specific property data count, the memory control circuit unit is further configured to determine whether at least one first candidate physical erasing unit is included in the physical erasing units belonging to the first part, wherein the specific property data count of the at least one first candidate physical erasing unit meets a predetermined relation with a predetermined value,
- wherein if the at least one first candidate physical erasing unit is included in the physical erasing units belonging to the first part, the memory control circuit unit is further configured to use the at least one first candidate physical erasing unit in the physical erasing units belonging to the first part as the at least one first physical erasing unit,
- wherein if the at least one first candidate physical erasing unit is not included in the physical erasing units belonging to the first part, the memory control circuit unit is further configured to determine whether at least one second candidate physical erasing unit is included in the physical erasing units belonging to the second part, wherein the specific property data count of the at least one second candidate physical erasing unit meets the predetermined relation with the predetermined value, wherein if the at least one second candidate physical erasing unit is included in the physical erasing units belonging to the second part, the memory control circuit unit is further configured to use the at least one second candidate physical erasing unit in the physical erasing units belonging to the second part as the at least one first physical erasing unit.

19. The memory storage device of claim 18, wherein in the operation of selecting the second physical erasing unit from the at least one first physical erasing unit according to the second parameter, the memory control circuit unit is further configured to select the second physical erasing unit from the at least one first physical erasing unit according to the erasing count, wherein the erasing count of the second physical erasing unit is less than the erasing count of other physical erasing unit in the at least one first physical erasing unit.

20. The memory storage device of claim 18, wherein each of the physical erasing units comprises a plurality of physical programming units, the specific property data count of each of the at least part of the physical erasing units indicates a number of the physical programming units stored with invalid data among the physical programming units in each of the at least part of the physical erasing units, and the predetermined relation is the specific property data count being greater than predetermined value.

21. The memory storage device of claim 20, wherein the memory control circuit unit is further configured to divide a number of the at least part of the physical erasing units by a number of the physical erasing units of the rewritable non-volatile memory module in order to obtain a first value, wherein the memory control circuit unit is further configured to multiply a number of the physical programming units in one physical erasing unit among the physical erasing units by the first value in order to obtain a second value, wherein the memory control circuit unit is further configured to subtract the second value from the number of the physical programming units in one physical erasing unit in order to obtain a third value, and set the third value as the predetermined value.

22. The memory storage device of claim 18, wherein each of the physical erasing units comprises a plurality of physical programming units, the specific property data count of each of the at least part of the physical erasing units indicates the number of the physical programming units stored with valid data among the physical programming units in each of the at least part of the physical erasing units, and the predetermined relation is the specific property data count being less than predetermined value.

* * * * *